United States Patent [19]

Calkins

[11] Patent Number: 4,556,195
[45] Date of Patent: Dec. 3, 1985

[54] FORCE AND MULTIPLICATION CONTROL VALVE

[76] Inventor: Noel C. Calkins, 352 Bryce, Box 416, Los Alamos, N. Mex. 87544

[21] Appl. No.: 648,075

[22] Filed: Sep. 7, 1984

[51] Int. Cl.⁴ .............................................. F16K 31/06
[52] U.S. Cl. ........................... 251/129.20; 251/129.14; 251/157; 137/901
[58] Field of Search ................. 137/DIG. 2; 251/138, 251/141, 82, 129, 369, 204, 157

[56] References Cited

U.S. PATENT DOCUMENTS

| 904,056 | 11/1908 | Farrell. | |
|---|---|---|---|
| 3,217,743 | 11/1965 | Ambille. | |
| 3,273,851 | 9/1966 | Rosch et al. | 251/204 |
| 3,368,792 | 2/1968 | Schertler | 251/204 |
| 3,706,323 | 12/1972 | Hayner et al. | |
| 4,008,878 | 2/1977 | Himmelman et al. | |
| 4,018,419 | 4/1977 | Monpetit. | |
| 4,057,216 | 11/1977 | Flaschar et al. | |
| 4,151,861 | 5/1979 | Bohrdt et al. | |
| 4,457,340 | 7/1984 | Krueger | 137/DIG. 2 |

Primary Examiner—Samuel Scott
Assistant Examiner—Noah Kamen
Attorney, Agent, or Firm—William W. Cochran, II

[57] ABSTRACT

A force and multiplication control valve which utilizes ball leverage to produce multiplied forces on a ball lock seat device. Constantly changing wear surfaces provide self-cleaning and self-compensating wear characteristics to provide extremely high reliability of the device of the present invention. Non-hardened metals can be used because of the self-compensating wear characteristics. High pressures can be handled by the valve of the present invention because of the ability to use metals for metal contact surfaces to produce a valve seal. Additionally, the present invention can be used with many fluids which would normally be corrosive to materials used in valves employing rubber-type seals. The device can be configured to act as a pressure regulator control valve, a solenoid valve and can be used with various fluids including gases and liquids.

26 Claims, 3 Drawing Figures

FORCE AND MULTIPLICATION CONTROL VALVE

BACKGROUND OF THE INVENTION

The present invention pertains generally to valves, and more particularly to valves employing ball lock seats.

Control valves are used in various applications such as pressure regulators, solenoid valves, etc. The weak link of most systems employing control valves is the control valve itself. The general lack of reliability of control valves, especially solenoid valves, results from problems such as sticking, seat cutting and leaking. To obtain a satisfactory seal, many solenoid valves use rubber or derivatives of rubber or elastomers such as Viton which has sufficient flexibility to provide a seal under most operating conditions. However, such sealing devices are often affected by heat, aromatic hydrocarbons or other environments which can normally corrode the sealing material. Problems are often encountered in environments containing propane, butane, natural gas, and other chemical materials. Additionally, solenoid valves are often used in high pressure environments which require high seat pressures to obtain a seal. High seat pressures required in high pressure applications often result in cutting or other damage to typical elastomeric seals employed in solenoid valves and other control valves. High pressure environments also result in sticking of the control valve, especially if the seal has been damaged. Contamination of the seal material flowing through the valve also causes leaking and sticking of the valve, especially where flat or tapered seats are utilized. Contamination also causes clogging of small orifices used in pilot operated valves resulting in improper operation. Additionally, more powerful solenoid driving systems which consume more energy and are bulkier and more expensive, are required to overcome inherent friction and produce the seating pressures required for many applications.

Although these problems have been overcome to some extent by ball lock seats such as disclosed in U.S. Pat. No. 904,056, issued Nov. 17, 1908, to Farrell, U.S. Pat. No. 3,217,743, issued Nov. 16, 1965, to Ambille, U.S. Pat. No. 4,008,878, issued Feb. 22, 1977, to Himmelman, U.S. Pat. No. 4,018,419, issued Apr. 19, 1977, to Monpetit, U.S. Pat. No. 4,151,861, issued May 1, 1979, to Bohrdt et al., U.S. Pat. No. 4,057,216, issued Nov. 8, 1977, to Flaschar et al., and U.S. Pat. No. 3,706,323, issued Dec. 19, 1972, to Hayner et al., all of which are specifically incorporated by reference for all that they disclose, the disclosed ball lock seat devices disclosed in the above patents and in the prior art suffer from many disadvantages and limitations. For example, the Himmelman and Farrell references both disclose the use of movable inclined planes to close a ball check valve radially disposed from the direction of motion of the inclined plane. Centering of the ball check valve is accomplished only by way of a tapered seat. Forces generated by the inclined plane are not centered within the tapered seat so that wear is concentrated in a single direction along an area opposite to the inclined plane on the valve seat ridge. Consequently, reliability over extended periods of use is limited due to the uneven surface wear resulting from these ball lock seat devices.

SUMMARY OF THE INVENTION

The present invention overcomes the disadvantages and limitations of the prior art by providing a control valve employing ball leverage which is capable of generating a uniform force between the sealing surface of a valve seat and a ball check valve to ensure a uniform and evenly wearing sealing surface. An armature shaft is used to apply an actuation force to induce movement of an armature sphere disposed to interact with at least three ramp spheres which are constrained to roll along an inclined surface and transmit a reduced movement to a ball check valve or valve sphere. The ramps spheres are arranged to provide a symmetrical central opening to centrally align the armature sphere and the ramp sphere to force the valve sphere against the valve seat with a uniform sealing force which is multiplicatively larger than the actuation force by a multiplication factor equal to the quotient of the movement of the armature sphere divided by the movement of the valve sphere. Consequently, ball leverage is employed to increase the sealing force between the valve sphere and the valve seat and uniformly apply the force to the valve seat to produce self-compensating wear characteristics. Additionally, the armature sphere, ramp spheres, and valve sphere move within the control valve to expose constantly changing wear surfaces to provide even wear of these spheres. This allows for use of non-hardened metal materials for both the valve seat and spheres. The constantly changing wear surfaces also provide for self-cleaning of corrosion from the spheres and valve seat. The increased force generated between the valve sphere and valve seat allows the present invention to be used in high pressure applications with a reduced likelihood of leakage. The metal surfaces allow the application of extremely high pressures without damaging the sealing surface. Expensive hardened surfaces are not required to provide a tight seal because of the even wear characteristics produced by the constantly changing wear surfaces of the present invention. The metal spheres used in the present invention are not significantly affected by heat, aromatic hydrocarbons or other chemical environments which normally attack rubber and its derivatives such as Viton. Consequently, the present invention is ideal for use with fluids such as propane, butane, natural gas and many other chemicals. Contaminants are readily removed by the self-cleaning action of the constantly changing wear surfaces of the spheres and valve seat. Sticking of the valve sphere in the valve seat is less likely to occur in the present invention, even at high pressures, because of the even wear characteristics and reduced likelihood of damage to the metal to metal contact surfaces. Additionally, the use of spheres virtually eliminates friction so as to allow easy movement of the armature shaft.

Consequently, the present invention may comprise a valve for controlling the pressure and flow of a fluid comprising an armature for producing an actuation force, an armature sphere disposed to contact the armature and transfer the actuation force, a valve seat located in a flow orifice of the valve, a valve sphere for forming a seal with the valve seat ramp spheres disposed between the armature sphere and the valve sphere and arranged to form a central opening to centrally align the armature sphere and the ramp spheres to uniformly and evenly transfer the actuation force from the armature sphere through the ramp spheres to the valve sphere, a conical ramp for controlling movement of the ramp sphere along a surface which forms a predetermined angle with the direction of the actuation force to reduce the axial distance of movement of the valve sphere and produce a substantially uniform and even sealing force between the valve sphere and the valve seat which is proportionally larger than the actuation force by a multiplication factor equal to the quotient of the axial distance of movement of the armature sphere divided by the axial distance of movement of the valve sphere.

The present invention may also comprise a control valve having constantly changing wear surfaces which are self-cleaning and have self-compensating wear characteristics, the control valve comprising a valve means having inlet and outlet passages which communicate with a central chamber to allow passage of fluid through the control valve, a valve seat defining an opening of the inlet passage in the central chamber, a valve sphere for forming a contact seal with the valve seat, an armature sphere for providing a spherical force transmitting surface, a conical surface for providing an inclined surface in the central chamber, ramp spheres disposed between the armature sphere and the valve sphere and arranged to provide a symmetrical central opening to centrally align the armature sphere and the ramp sphere, the ramp spheres constrained to roll along the inclined surface of the conical surface, an armature for applying an actuation force to the armature sphere which is uniformly and concentrically transferred to the ramp spheres from the armature sphere to cause the ramp spheres to roll along the inclined surface and induce a reduced movement to the valve sphere to force the valve sphere against the valve seat with a sealing force which is greater than the actuation force by a factor proportional to the quotient of the distance of movement of the armature sphere divided by the distance of movement of the valve sphere, so that the valve sphere, the armature sphere and the ramp spheres oscillate during flow of the fluid through the valve to provide the constantly changing wear surface.

OBJECTS OF THE INVENTION

It is therefore an object of the present invention to provide an improved control valve.

It is also an object of the present invention to provide a valve for controlling the pressure and flow of a fluid.

Another object of the present invention is to provide a control valve having constantly changing wear surfaces which are self-cleaning and have self-compensating wear characteristics.

Another object of the present invention is to provide a control valve which can be used in high pressure applications.

Another object of the present invention is to provide a control valve which is inexpensive and reliable.

Another object of the present invention is to provide a control valve which utilizes standard non-hardened metal surfaces.

Additional objects, advantages and novel features of the invention are set forth in part in the description which follows and will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWINGS

An illustrative and presently preferred embodiment of the invention is shown in the accompanying drawings wherein.

DETAILED DESCRIPTION OF THE PREFERRED EMBODIMENT OF THE INVENTION

Figure 1:
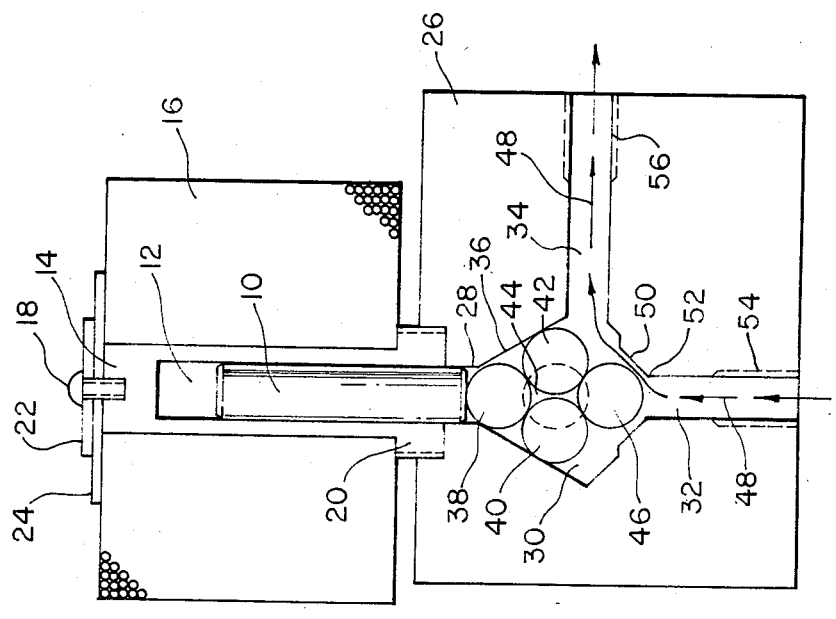
FIG. 1 is a side sectional view of the valve of the present invention in an open position.

FIG. 1 illustrates the valve of the present invention in an open position. Armature shaft 10 is disposed in a shaft opening 12 formed in yoke 14. Armature shaft 10 is readily movable in shaft opening 12 upon actuation of an electromotive force from solenoid coil 16. Solenoid coil 16 is coupled to yoke 14 by way of connector 18 between flange portion 20 of yoke 14 and washers 22, 24. Yoke 14 is pressfit into housing 26 of the valve. Housing 26 has an opening 28 for movement of armature shaft 10 in a vertical direction. Housing 26 has a central chamber 30 which communicates with inlet passage 32 and outlet passage 34 which allow passage of a fluid through the control valve. Central chamber 30 has a conical ramp surface 36 formed adjacent opening 28. Conical ramp surface 36 forms a predetermined angle with the direction of movement of armature shaft 10 and provides sufficient room for passage of fluid through central chamber 30 between inlet passage 32 and outlet passage 34 as indicated by arrows 48. An armature sphere 38 is disposed adjacent armature shaft 10 in opening 28. At least three ramp spheres 40, 42, 44 are disposed within central chamber 30 adjacent armature sphere 38. Ramp spheres 40, 42, 44 are disposed in a generally triangular configuration to form a central opening centrally aligned with armature sphere 38. Conical ramp surface 36 is concentrically aligned with shaft opening 12 and armature shaft 10 as well as opening 28 to centrally align armature sphere 38 with the central opening of ramp spheres 40, 42, 44 whenever ramp spheres 40, 42, 44 are disposed against conical ramp surface 36 as illustrated in FIG. 1. Similarly, valve sphere 46 is centrally aligned in the central opening formed on the lower side of the triangular configuration of ramp sphere 40, 42, 44. Inlet passage 32 has a conical surface 50 defining the opening of inlet passage 32 to central chamber 30. The size and shape of conical surface 50 and inlet passage 32 form a valve seat 52 in housing 26 in which valve sphere 46 can be seated. The pressure flow of fluid in the direction illustrated by arrows 48 maintains valve sphere 46, ramp spheres 40, 42, 44 and armature sphere 38 in the upwardly disposed position illustrated in FIG. 1. Oscillation of the five spheres shown with the valve in the open position provides a constantly changing wear surface to produce self-compensating wear characteristics of the five spheres shown and the surfaces which they contact in central chamber 30. Inlet passage 32 joins conical surface 50 to form valve seat 52, which is of the proper size to form a tight seal with valve sphere 46. Inlet passage 32 is concentrically aligned with conical ramp surface 36, opening 28, armature shaft 10, and shaft opening 12 such that the central opening formed by ramp spheres 40, 42, 44 is aligned with inlet passage 32. Threaded connector 54 in inlet passage 32 and threaded connector 56 in outlet passage 34 provide a means for connecting external devices to valve housing 26.

Figure 2:
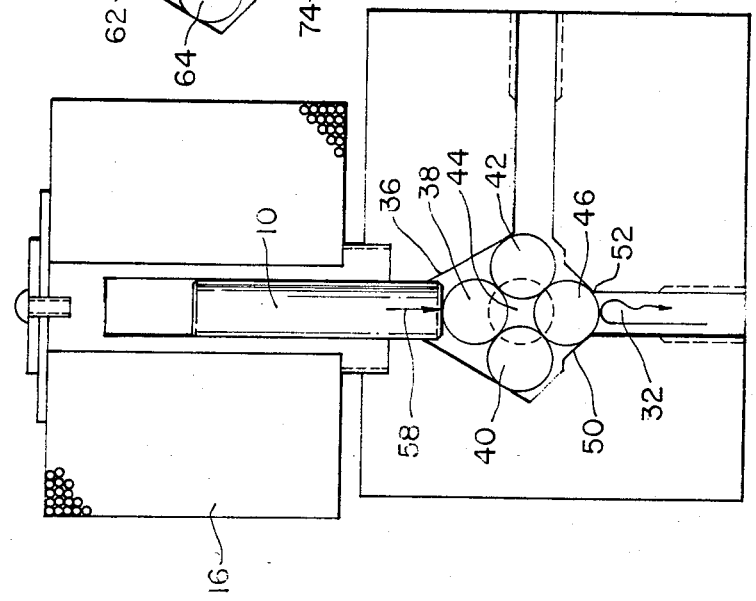
FIG. 2 is a side sectional view of the valve of the present invention in a closed position.

FIG. 2 is a schematic illustration of the valve of the present invention in a closed position. Application of electrical power to solenoid coil 16 causes an electromotive force to drive armature shaft 10 in a downward direction as illustrated by arrow 58 to produce an actuation force which is applied to armature sphere 38. Armature sphere 38 transfers the actuation force of the armature shaft 10 to ramp spheres 40, 42, 44 to cause ramp spheres 40, 42, 44 to roll along the inclined surface of conical ramp surface 36. The actuation force is uniformly and concentrically transferred to ramp sphres 40, 42, 44 to cause ramp spheres 40, 42, 44 to move in a concentric manner along the inclined conical ramp surface 36 and transfer the actuation force to valve sphere 46 such that valve sphere 46 is seated in valve seat 52 with a uniform and concentric force applied evenly and concentrically around the contact surface between valve sphere 46 and valve seat 52. Inclined conical surface 50 also aids in central alignment of valve sphere 46 on valve seat 52.

The inclination of conical ramp surface 36 causes ramp spheres 40, 42, 44 to outwardly expand during downward travel so that the movement of valve sphere 46 translated by ramp spheres 40, 42, 44 is less than the movement of armature sphere 38 and armature shaft 10 by a factor porportional to the inclination of conical ramp surface 36. The reduction of movement of valve sphere 46 translates into a multiplication of the actuation force provided by armature shaft 10 on valve sphere 46 which is proportional to the quotient of the axial movement of the armature sphere 38 divided by the axial movement of the valve sphere 46. As illustrated in FIG. 2, the inclination of conical ramp surface 36 is approximately 30° from the direction of the actuation force disclosed by arrow 58. This relationship produces a force multiplication of approximately 2.5 to 1 on valve sphere 46. As a result, the sealing force produced at the interface between valve sphere 46 and valve seat 52 is approximately 2.5 times as great as the actuation force induced by armature shaft 10. Consequently, much higher pressures produced in inlet passage 32 can be adequately sealed with the valve of the present invention by applying an actuation force which is multiplicatively smaller than the sealing force required to withstand such pressures. This advantage considerably reduces the size and power requirements of solenoid coil 16. Additionally, use of spheres in the control valve of the present invention considerably reduces frictional forces to further reduce the actuation force required to overcome frictional effects. Because of the constantly changing wear surfaces and self-compensating wear characteristics of the present invention, non-hardened metals can be used to provide a reliable device capable of producing high sealing forces without damage to valve surfaces. Self-compensating wear characteristics provide reliability over long periods of use. Proper design of conical surface 50 produces a valve seat 52 which avoids sticking and leaking. Constantly changing wear surfaces also provide for self-cleaning of active surfaces within the control valve to further add to the reliability of operation of the device over extended periods.

Of course, the inclination of the inclined surface of conical ramp surface 36 can be changed to suit the specific requirements of the valve. For example, different inclinations can be utilized to increase the sealing force produced by valve sphere 46. Also, the length of conical ramp surface 36 can be changed as well as the position of outlet passage 34 to adjust the flow characteristics of the valve in the open position, as illustrated in FIG. 1. Moreover, both the inclination of conical ramp surface 36 and the position of outlet passage 34 can be adjusted as well as the distance of travel of armature shaft 10 and the length of conical ramp surface 36 to modify or regulate the back pressure produced on the fluid in inlet passage 32. In this manner, the control valve of the present invention can be employed as a pressure regulator device. Additionally, movement of armature shaft 10 can be controlled by the electromotive force produced by solenoid coil 16 to continuously adjust the back pressure in inlet passage 32 from a fully open configuration to a fully closed configuration in accordance with the position of shaft 10.

Figure 3:
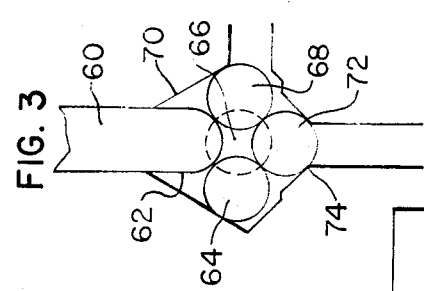
FIG. 3 is a side sectional view of another embodiment of the invention.

FIG. 3 discloses an alternative embodiment of the present invention employing an armature shaft 60 having a rounded end portion 62. Rounded end portion 62 engages ramp spheres 64, 66 and 68 in the same manner in which armature sphere 38, as illustrated in FIGS. 1 and 2, engages ramp spheres 40, 42 and 44. Armature shaft 60 is concentrically aligned with conical ramp surface 70 so that a concentric and uniform force is applied to ramp spheres 64, 66, 68. This generates a uniform force on valve sphere 72 which produces a uniform pressure on valve seat 74 which is concentrically aligned with armature shaft 60. Consequently, rounded end portion 62 functions in essentially the same manner as armature sphere 38 by causing ramp spheres 64, 66 and 68 to outwardly expand during downward travel to transfer an actuation force on armature shaft 60 to valve sphere 72.

The foregoing description of the invention has been presented for purposes of illustration and description. It is not intended to be exhaustive or to limit the invention to the precise form disclosed and other modifications and variations may be possible in light of the above teachings. For example, although three ramp spheres have been illustrated in FIGS. 1, 2 and 3, any number spheres could be utilized depending on space requirements. Additionally, other various configurations can be used to accomplish the intended results of the present invention. The disclosed embodiment was chosen and described in order to best explain the principles of the invention and its practical application to thereby to enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A valve for controlling the pressure and flow of a fluid comprising:
   armature means for producing and transferring an actuation force;
   valve seat means for forming a valve seat in a flow orifice of said valve;
   valve sphere means for forming a seal with said valve seat means;
   ramp sphere means disposed between said armature means and said valve sphere means and arranged to form a central opening to centrally align said armature means and said ramp sphere means to uniformly and evenly transfer said actuation force from said armature means through said ramp sphere means to said valve sphere means;

conical ramp means for controlling movement of said ramp sphere means along a surface which forms a predetermined angle with the direction of said actuation force to reduce the axial distance of movement of said valve sphere means and produce a substantially uniform and even sealing force between said valve sphere means and said valve seat means which is proportionally larger than said actuation force by a factor equal to the quotient of the axial distance of movement of said armature means divided by the axial distance of movement of said valve sphere means.

2. A valve for controlling the pressure and flow of a fluid comprising:

armature means for producing an actuation force;

armature sphere means disposed to contact said armature means and transfer said actuation force;

valve seat means for forming a valve seat in a flow orifice of said valve;

valve sphere means for forming a seal with said valve seat means;

ramp sphere means disposed between said armature sphere means and said valve sphere means and arranged to form a central opening to centrally align said armature sphere means and said ramp sphere means to uniformly and evenly transfer said actuation force from said armature sphere means through said ramp sphere means to said valve sphere means;

conical ramp means for controlling movement of said ramp sphere means along a surface which forms a predetermined angle with the direction of said actuation force to reduce the axial distance of movement of said valve sphere means and produce a substantially uniform and even sealing force between said valve sphere means and said valve seat means which is multiplicatively larger than said actuation force by a factor equal to the quotient of the axial distance of movement of said armature sphere means divided by the axial distance of movement of said valve sphere means.

3. The valve of claim 2 wherein said ramp sphere means comprises:

at least three spheres arranged in a generally triangular configuration between said armature sphere means and said valve sphere means.

4. The valve of claim 3 wherein said armature sphere means, said valve seat means, said valve sphere means and said ramp sphere means are formed of non-hardened metal which is capable of providing reliable operation over extended periods because of even wear characteristics of said valve.

5. The valve of claim 2 wherein said armature sphere means, said valve seat means, said valve sphere means and said ramp sphere means are formed of non-hardened metal which is capable of providing reliable operation over extended periods because of even wear characteristics of said valve.

6. The valve of claim 5 wherein said valve comprises a pressure regulator.

7. The valve of claim 5 wherein said armature means, said conical ramp means and said valve seat means are concentrically aligned around a single axis to center said valve sphere means on said valve seat means.

8. The valve of claim 5 wherein said valve comprises a solenoid valve.

9. The valve of claim 5 further comprising:
solenoid means for actuating said armature means.

10. The valve of claim 7 further comprising:
solenoid means for actuating said armature means.

11. The valve of claim 7 wherein said valve seat means is conically shaped to form an angle which provides a tight seal between said valve seat means and said valve sphere means and prevents binding and sticking of said valve sphere means in said valve seat means.

12. The valve of claim 11 wherein said conical ramp means forms an angle with said axis of approximately 30°.

13. The valve of claim 7 wherein said fluid comprises a gas.

14. The valve of claim 7 wherein said fluid comprises a liquid.

15. The valve of claim 2 wherein said angle said conical ramp means forms with said axial direction produces a predetermined pressure bias in said valve means.

16. The valve of claim 2 wherein said fluid comprises a food substance.

17. A control valve having constantly changing wear surfaces which are self-cleaning and have self-compensating wear characteristics, said control valve comprising:

valve housing means having inlet and outlet passages which communicate with a central chamber to allow passage of fluid through said control valve;

valve seat means defining an opening of said inlet passage in said central chamber;

valve sphere means for forming a contact seal with said valve seat means;

armature sphere means for providing spherical force transmitting surface;

conical surface means for providing an inclined surface in said central chamber;

ramp sphere means disposed between said armature sphere means and said valve sphere means and arranged to provide a symmetrical central opening to centrally align said armature sphere means and said ramp sphere means, said ramp sphere means constrained to roll along said inclined surface of said conical surface means;

armature means for applying an actuation force to said armature sphere means, the actuation force being uniformly and concentrically transferred to said ramp sphere means from said armature sphere means to cause said ramp sphere means to roll along said inclined surface and induce a reduced movement to said valve sphere means to force said valve sphere means against said valve seat means with a sealing force which is multiplicatively greater than said actuation force, whereby said valve sphere means, said armature sphere means and said ramp sphere means oscillate during flow of said fluid through said valve to provide said constantly changing wear surface.

18. The valve of claim 17 wherein said ramp sphere means comprises at least three spheres.

19. The valve of claim 17 wherein said ramp sphere means comprises at least four spheres.

20. The valve of claim 17 wherein said valve seat means is conically shaped and is disposed at an angle which provides a tight seal and prevents binding and sticking of said valve sphere means.

21. The valve of claim 17 wherein said valve comprises a solenoid valve.

22. The valve of claim 17 wherein said valve comprises a pressure regulator valve.

23. The valve of claim 22 wherein said conical surface means has a predetermined angle designed to provide a predetermined regulator pressure.

24. The valve of claim 17 wherein said armature means said conical ramp means and said valve seat means are concentrically aligned around a single axis to center said valve sphere means on said valve seat means.

25. The valve of claim 24 further comprising:
solenoid means for actuating said armature means.

26. The valve of claim 17 wherein said valve is made from non-hardened metal having self-compensating wear characteristics.

* * * * *